United States Patent [19]

Shuck et al.

[11] Patent Number: 4,937,793
[45] Date of Patent: Jun. 26, 1990

[54] PROCESSING METHOD FOR MARINE SEISMIC SURVEYING UTILIZING DUAL STREAMERS

[75] Inventors: Edward L. Shuck, Dallas; Joe I. Sanders, Sugarland, both of Tex.; David Monk, Royneberg, Norway

[73] Assignee: Halliburton Geophysical Services, Inc., Houston, Tex.

[21] Appl. No.: 358,887

[22] Filed: May 30, 1989

[51] Int. Cl.$^5$ ............................................. G01V 1/38
[52] U.S. Cl. ....................................... 367/24; 367/20; 367/21
[58] Field of Search ....................... 367/21, 24, 57, 58, 367/59, 20; 181/112

[56] References Cited

U.S. PATENT DOCUMENTS

| | | | |
|---|---|---|---|
| H387 | 12/1987 | Kruka et al. | 367/154 |
| Re. 23,552 | 9/1952 | Babb et al. | 177/352 |
| 1,584,613 | 5/1926 | Comstock et al. | 367/130 |
| 2,627,930 | 2/1953 | Woods | 181/5 |
| 2,740,945 | 4/1956 | Howes | 340/15 |
| 2,753,948 | 7/1956 | Onoaro | 181/33 |
| 2,757,356 | 7/1956 | Haggerty | 340/7 |
| 2,791,757 | 5/1957 | Blake et al. | 340/7 |
| 2,807,793 | 9/1957 | Bavhi | 340/17 |
| 2,856,594 | 10/1958 | McLoad | 340/17 |
| 2,882,988 | 4/1959 | Dobrin | 181/5 |
| 2,906,992 | 9/1959 | Wilcoxon | 340/8 |
| 2,923,367 | 2/1960 | Cox | 181/0.5 |
| 3,054,085 | 9/1962 | Alexander | 340/15 |
| 3,274,542 | 9/1966 | Ruehle | 340/15 |
| 3,281,768 | 10/1966 | Pavey, Jr. et al. | 340/7 |
| 3,286,227 | 11/1966 | Aldrich | 340/13 |
| 3,290,645 | 12/1966 | Pavey, Jr. et al. | 340/7 |
| 3,299,397 | 1/1967 | Pavey, Jr. et al. | 340/7 |
| 3,304,364 | 2/1967 | Hetherington | 174/101 |
| 3,319,734 | 5/1967 | Pavey, Jr. | 181/0.5 |
| 3,343,626 | 9/1967 | Sparks | 181/0.5 |
| 3,350,683 | 10/1967 | Sengbush | 340/7 |
| 3,354,860 | 11/1967 | Dale et al. | 114/235 |
| 3,354,984 | 11/1967 | Pavey, Jr. | 181/0.5 |
| 3,369,216 | 2/1968 | Loper | 340/7 |
| 3,371,311 | 2/1968 | Cholet et al. | 340/17 |
| 3,409,871 | 11/1968 | Heffring | 340/15 |

(List continued on next page.)

FOREIGN PATENT DOCUMENTS 1316479 11/1970 United Kingdom .
2004648 4/1979 United Kingdom .
2030400 4/1980 United Kingdom .

OTHER PUBLICATIONS

Brink et al., "Marine Seismic Exploration Using Vertical Receiver Arrays:", 57th SEG Mtg., Oct. 11-15, 1987, New Orleans.

(List continued on next page.)

Primary Examiner—Ian J. Lobo

[57] ABSTRACT

A processing method is disclosed for marine seismic surveying which utilizes two vertically spaced marine streamers each having a plurality of seismic detectors contained therein. A seismic energy source positioned at or near the surface of a body of water is utilized to generate seismic waves which propagate into earth formations below the water and reflect back up to be detected at each streamer. Seismic waves also reflect from the water/air interface back down toward the streamers and must be separated from the upgoing seismic waves to enhance the accuracy of the resultant trace. The seismic waves detected at two selected vertically displaced seismic detectors are combined to form a sum signal which is then combined with a scaled time integral of a difference signal to form a resultant signal which preserves either the upgoing or downgoing seismic waves. In a preferred embodiment of the present invention, the sum signal and the integral signal are both filtered to remove DC bias and low frequency components prior to the combination. Additionally, the time integral of the difference signal is preferably scaled by balancing the power therein with the power in the sum signal, thereby automatically adjusting for variations in detector spacing which may occur. In one embodiment of the present invention, the upgoing signal and downgoing signal are time shifted and combined to maximize the resultant signal-to-noise ratio.

13 Claims, 2 Drawing Sheets

U.S. PATENT DOCUMENTS

| | | | |
|---|---|---|---|
| 3,441,902 | 4/1969 | Savit | 340/7 |
| 3,491,848 | 1/1970 | Giles | 181/0 |
| 3,518,677 | 6/1970 | Florian | 340/7 |
| 3,696,329 | 10/1972 | Hazelhurst | 340/7 |
| 3,710,006 | 1/1973 | Davis | 174/101 |
| 3,739,328 | 6/1973 | Beil | 340/15 |
| 3,860,899 | 1/1975 | Watlington | 340/3 |
| 3,863,201 | 1/1975 | Briggs et al. | 340/15 |
| 3,866,161 | 2/1975 | Barr, Jr. et al. | 340/15 |
| 3,893,065 | 7/1975 | Lea et al. | 340/8 |
| 3,930,254 | 12/1975 | Pavey, Jr. | 340/7 |
| 3,932,835 | 1/1976 | Abbott | 340/7 |
| 3,943,484 | 3/1976 | Balderson | 340/7 |
| 3,964,424 | 6/1976 | Hagemann | 114/235 |
| 3,979,713 | 9/1976 | Parrack | 340/7 |
| 3,990,039 | 11/1976 | Miller | 340/17 |
| 4,038,630 | 7/1977 | Chelminski | 340/7 |
| 4,078,223 | 3/1978 | Strange | 340/7 |
| 4,090,168 | 5/1978 | Miller et al. | 340/3 |
| 4,117,447 | 9/1978 | Gould et al. | 340/4 |
| 4,134,097 | 1/1979 | Cowles | 340/7 |
| 4,146,871 | 3/1979 | Ruehle | 340/7 |
| 4,160,229 | 7/1979 | McGough | 340/7 |
| 4,210,897 | 7/1980 | Hutchins | 367/106 |
| 4,276,620 | 6/1981 | Kahn et al. | 367/60 |
| 4,296,481 | 10/1981 | Weiss | 367/20 |
| 4,317,185 | 2/1982 | Thiopen et al. | 367/15 |
| 4,345,473 | 8/1982 | Berni | 73/516 |
| 4,348,749 | 9/1982 | Galbraith, Jr. | 367/46 |
| 4,353,121 | 10/1982 | Ray et al. | 367/21 |
| 4,380,059 | 4/1983 | Ruehle | 367/46 |
| 4,402,069 | 8/1983 | Miller et al. | 367/154 |
| 4,415,997 | 11/1983 | Wilson | 367/15 |
| 4,437,175 | 3/1984 | Berni | 367/24 |
| 4,439,497 | 3/1984 | DiFoggio | 428/539 |
| 4,449,208 | 5/1984 | Moeckel et al. | 367/30 |
| 4,477,887 | 10/1984 | Berni | 367/20 |
| 4,486,865 | 12/1984 | Ruehle | 367/24 |
| 4,510,588 | 4/1985 | Kruka et al. | 367/165 |
| 4,520,467 | 5/1985 | Berni | 367/24 |
| 4,581,724 | 4/1986 | Zachariadis | 367/21 |
| 4,633,449 | 12/1986 | Ingram et al. | 367/75 |
| 4,644,507 | 2/1987 | Ziolkowski | 367/23 |
| 4,644,508 | 2/1987 | Zachariadis | 367/24 |
| 4,660,183 | 4/1987 | McGowan et al. | 367/15 |
| 4,679,179 | 7/1987 | Lally | 367/162 |
| 4,685,090 | 8/1987 | Krevor | 367/20 |
| 4,733,378 | 3/1988 | Pearce et al. | 367/17 |
| 4,733,379 | 3/1988 | Lapetina et al. | 367/20 |
| 4,734,891 | 3/1988 | McGowan et al. | 367/15 |
| 4,736,345 | 4/1988 | Keckler et al. | 367/20 |
| 4,752,916 | 6/1988 | Loewenthal | 367/24 |
| 4,765,436 | 8/1988 | Dowell | 181/207 |
| 4,794,573 | 12/1988 | Bell et al. | 367/57 |
| 4,809,243 | 2/1989 | Bledsoe et al. | 367/154 |
| 4,813,028 | 3/1989 | Liu | 367/31 |
| 4,821,241 | 4/1989 | Berglund | 367/20 |
| 4,837,751 | 6/1989 | Kruka et al. | 367/154 |

OTHER PUBLICATIONS

Bell et al., "Two-Trace Directional Filter for Processing . . . ", published by Society of Exploration Geophysicists, 1987, ann. conf., pp. 768-769.

Brink, "Application of Vertical Receiver Arrays in 3-D . . . ", published by Society of Exploration Geophysicists, 1988 ann. conf., pp. 460-463.

Brink, "Marine Seismic Exploration Using Vertical Receiver Arrays: . . . ", 49th Mtg. of European Assn. of Exploration Geophysicists, Jun. 1987.

Monk, "Wavefield Separation of Twin Streamer Data", presented at 51st Ann. Mtg of the European Assn of Exploration Geophysicists, Jun. 1989.

Gal'perin, "Vertical Seismic Profiling", published by Society of Exploration Geophysicists, Pubn. No. 12, pp. 96-99.

Treitel et al., "Plane-Wave Decomposition of Seismograms", Geophysics, vol. 47, No. 10, Oct. 1982, pp. 1375-1401.

White, "Chapter 2-Plane Waves", Seismic Wave Radiation-Transmittion and Attenuation, McGraw Hill, 1965, pp. 15-41.

Ziolkowski et al., "Wavelet Deconvolution Using a Source Scaling Law", Geophysical Prospecting, vol. 28, 1980, pp. 872-901.

Cagniard, "Basic Theory of the Magneto-Telluric Method of Geophysical Prospecting", pp. 605-635.

Ziolkowski, "Source Array Scaling for Wavelet Deconvolution", Geophysical Prospecting, vol. 28, 1980, pp. 902-918.

Loewenthal, "Patents", Geophysics, vol. 53, Dec. 1988, p. 1627.

Loewenthal et al., "Source Signature Estimation Using Fictitious Source and Reflector", Geophysics, vol. 54, No. 7, Jul. 1989, pp. 916-920.

Dobrin et al., Introduction to Geophysical Prospecting, McGraw-Hill 1988.

Telford et al., Applied Geophysics, Cambridge University Press 1986.

PROCESSING METHOD FOR MARINE SEISMIC SURVEYING UTILIZING DUAL STREAMERS

BACKGROUND OF THE INVENTION

1. Field of the Invention

The present invention relates in general to the field of marine seismic surveying and in particular to the process of marine seismic surveying utilizing two vertically spaced streamers. Still more particularly, the present invention relates to method for enhancing the accuracy of seismic surveying by providing a method for eliminating secondary reflections of seismic waves downward from the surface of the body of water in which the marine survey is being taken.

2. Description of the Prior Art

Seismic surveying is well known in the prior art. Such surveying typically involves the utilization of a source of seismic energy and one or more arrays of seismic detectors which are strategically positioned to receive the seismic waves generated by the source of seismic energy. The source of seismic energy typically utilized may be an apparatus capable of delivering a series of impacts or mechanical vibrations to the surface of the earth or the detonation of a high explosive charge near the earth's surface. The resultant acoustic waves which are generated in the earth, including those which are reflected from the various strata interfaces within the formations of the earth, are then detected by seismic detectors which convert these acoustic waves into representative electrical signals. From these electrical signals, data may be deduced concerning the structure of these strata within the earth's surface.

Marine seismic surveying operates in much the same manner. An explosive device or vibration inducing compressed air system is typically utilized to generate seismic energy which then propagates as seismic waves into the earth formations below the surface of a body of water. Reflections of this seismic energy from the various strata within the earth are then detected at a plurality of seismic receivers which are generally coupled together in so-called "streamers" and towed behind a marine craft. It is well known to utilize more than one streamer, each of which may contain over 10,000 seismic detectors. Further, multiple streamers are often towed in a vertically spaced alignment to permit variations due to the proximity of the water's surface to be factored out.

A problem in all forms of marine seismic processing occurs due to the fact that seismic wave energy, after reflecting from subterranean strata and traveling upward to the detectors within a streamer, will often reflect again at the water/air interface and travel downward, once again passing the detectors within a streamer. The complex nature of seismic wave signals makes interpretation difficult under the best of conditions; however, the addition of a downward traveling seismic wave renders this process exceedingly difficult.

A similar problem has occurred in so-called vertical seismic profiling or "VSP" wherein multiple seismic detectors are suspended beneath the surface of the earth in a borehole and seismic energy is imparted to the earth at the surface. As described above, with this situation the seismic waves which impact the detectors suspended within the borehole may be traveling upward due to reflections from subterranean strata or downward as a direct seismic wave generated by the seismic energy source.

U.S. Pat. No. 4,794,573, issued to Bell et al., and assigned to Conoco, Inc. of Ponca City, Okla., proposed a solution to this problem in VSP applications which is based upon the concept that waves traveling in opposite directions have spatial derivatives of opposite sign. In accordance with the Bell et al. method the derivative of the seismic signal is approximated by the difference of two signals from vertically spaced detectors which is then time integrated to recover the phase. The resulting integrated difference signal is then amplitude scale corrected and combined, by addition or subtraction, with a signal which represents the sum of the two detector signals to form a succession of filtered signals, which, when recorded in alignment in order of detector depths, form a vertical seismic profile which may preserve either the upgoing or downgoing seismic events.

The Bell et al. process represents a substantial improvement in the vertical seismic profiling environment; however, the accuracy of the process has been found to suffer due to the sensitivity of the integration process to the presence of small direct current bias within the recorded traces or low frequency components in general. Further, during vertical seismic profiling the detectors are spaced a fixed distance apart. This distance is known and may utilized to scale the integrated difference signal. In contrast, in a marine seismic environment the distance between two vertically displaced detectors within two seismic streamers will vary due to the dynamic nature of the process involved in towing a seismic streamer through a body of water. Thus, merely scaling the integrated difference signal as proposed in the process cannot be easily accomplished without introducing additional errors into the data.

It should therefore be apparent that a need exists for a process whereby upgoing and downgoing seismic waves may be easily separated during marine seismic surveying whereby the downward traveling reflections of seismic waves from the water/air interface will not adversely affect the accuracy of the recorded seismic events.

SUMMARY OF THE INVENTION

It is therefore one object of the present invention to provide an improved marine seismic surveying processing method.

It is another object of the present invention to provide an improved seismic surveying processing method utilizing multiple vertically spaced streamers.

It is yet another object of the present invention to provide an improved marine seismic surveying processing method utilizing multiple vertically spaced seismic streamers which enhances the accuracy of the seismic survey by eliminating the effect of secondary reflections of seismic waves downward from the water/air interface.

The foregoing objects are achieved as is now described. The method of the present invention utilizes at least two vertically spaced marine streamers each having a plurality of seismic detectors contained therein. A seismic energy source positioned at or near the surface of a body of water is then utilized to generate seismic waves which propagate into earth formations below the water and reflect back up to be detected at each streamer. Seismic waves also reflect from the water/air interface back down toward the streamers and must be separated from the upgoing seismic waves to enhance the accuracy of the resultant trace. The seismic waves detected at two selected vertically displaced seismic detectors are combined to form a sum signal which is then combined with a scaled time integral of a difference signal to form a resultant signal which preserves either the upgoing or downgoing seismic waves.

This resultant signal may be utilized to provide an upgoing or downgoing seismic signal which will appear to originate from an effective receiver position which is located midway between the two vertically spaced seismic detectors. Those skilled in the art will appreciate upon reflection that the reflection information contained in both the upgoing and downgoing signals is identical; however, the downgoing signal has ben delayed in time by twice the time distance from the effective receiver position to the water surface. Thus, by time shifting the downgoing signal and combining it with the upgoing signal it is possible to improve the signal-to-noise ratio of the resultant trace.

In a preferred embodiment of the present invention, the sum signal and the integral signal are both filtered to remove DC bias and low frequency components prior to combination. Additionally, the time integral of the difference signal is preferably scaled by balancing the power therein with the power in the sum signal, thereby automatically adjusting for variations in detector spacing which may occur.

The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
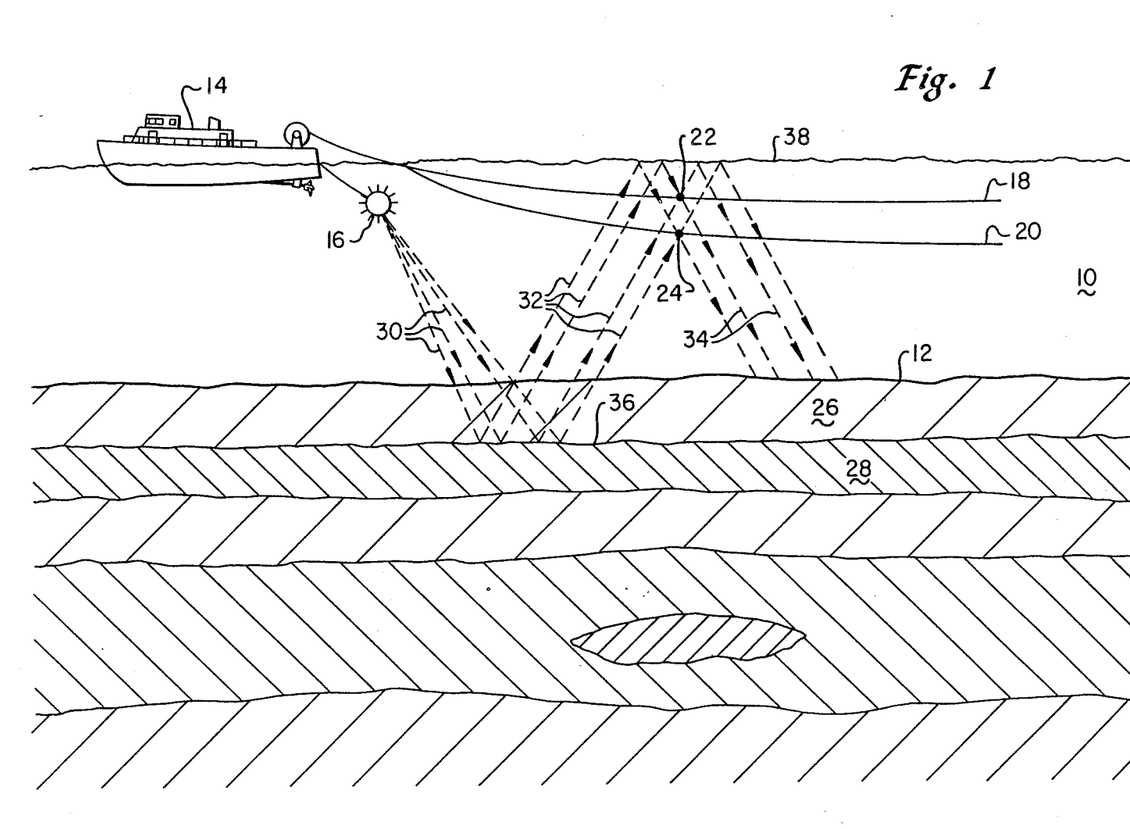
FIG. 1 is a diagramatic illustration of an earth cross-section under a body of water and a marine seismic survey in accordance with the method of the present invention.

With reference now to the figures and in particular with reference to FIG. 1, there is depicted a diagramatic illustration of a portion of the earth's surface under a body of water and a marine seismic survey being conducted in accordance with the method of the present invention. As may be seen, the marine seismic survey is being conducted within a body of water 10, which may comprise a lake or ocean, as is well known in the art. Body of water 10 is illustrated as overlying a portion of the earth's surface 12 which is to be investigated utilizing the marine seismic survey method of the present invention.

As is illustrated, a marine craft 14 is utilized in the depicted embodiment of the present invention and serves to tow a seismic source 16, disposed at or near the surface of body of water 10. Seismic source 16 comprises any source capable of generating seismic energy and may utilize an explosive device or a compressed air gun in order to generate such seismic waves. Also depicted in FIG. 1 are upper streamer 18 and lower streamer 20, which are towed by marine craft 14 beneath the surface of body of water 10. As those skilled in the art will appreciate, upper streamer 18 and lower streamer 20 will normally each comprise a large number of seismic detectors (not shown) which are coupled together to form the streamer. Two exemplary seismic detectors are illustrated in FIG. 1. Namely, upper detector 22 and lower detector 24; however, it should be appreciated that these two detectors are merely representative of many such detectors which will normally be utilized in a state-of-the-art marine streamer.

In operation the seismic waves generated by seismic source 16 will travel downward, as indicated at reference numeral 30, and be reflected off the various strata within the earth's surface. For purposes of simplification seismic waves 30 are illustrated as reflecting off interface 36 between strata 26 and 28. Of course, those skilled in the art will appreciate that seismic waves 30 will reflect off each interface within the surface of the earth and that the actual reflections are substantially more complex than the simplified illustration presented.

Next, the upward reflections of the illustrated seismic waves, as depicted at reference numeral 32, will travel upward generally passing the area occupied by upper streamer 18 and lower streamer 20. As is illustrated, these upward reflections will be detected by upper detector 22 and lower detector 24 and appropriate electrical signals will be generated which may be utilized to characterize the nature of the strata within the surface of the earth.

Thereafter, the upward reflections of the generated seismic waves will impact upon the water/air interface 38 which exists at the surface of body of water 10. In accordance with well known physical laws a portion of the energy within upward reflections 32 will then be reflected downward resulting in a second set of reflections in a downward direction, as illustrated at reference numeral 34. These downward reflections will once again pass through the area occupied by upper streamer 18 and lower streamer 20, resulting in the electrical signals being generated at each detector being a composite of both upgoing and downgoing seismic events.

In accordance with the method of the present invention there is depicted a process whereby it is possible to increase the amplitudes of the seismic waves traveling either upward or downward while simultaneously attenuating the waves traveling in the opposite direction. This may be described mathematically as follows. It is first assumed that a seismic detector which is located at the midpoint between upper detector 22 and lower detector 24 would record a trace which is the sum of the upwardly traveling and downwardly traveling wave fields. This trace may be expressed as follows in Equation 1:

$$MID(T) = U(T) + D(T) \tag{1}$$

Where U(T) represents the upwardly traveling wave field and D(T) represents the downwardly traveling wave field.

It therefore follows that what is actually recorded by upper detector 22 and lower detector 24 may be expressed as follows:

$$UPPER(T) = U(T+dt) + D(T-dt) \tag{2}$$

$$LOWER(T) = U(T-dt) + D(T=dt) \tag{3}$$

Where dt is equal to one-half the travel time between the actual receiver positions. As those skilled in the mathematical arts will appreciate, all of the terms within Equations 2 and 3 may be expanded utilizing a Taylor series expansion in dt, as illustrated below in Equations 4, 5, 6 and 7:

$$U(T + dt) = U(T) + U'(T) \cdot (-dt) + \text{other items} \quad (4)$$

$$D(T - dt) = D(T) + D'(T) \cdot (+dt) + \text{other items} \quad (5)$$

$$U(T - dt) = U(T) + U'(T) \cdot (+dt) + \text{other items} \quad (6)$$

$$D(T + dt) = D(T) + D'(T) \cdot (-dt) + \text{other items} \quad (7)$$

By rewriting Equations 2 and 3 and limiting the Taylor series expansion to the first order terms yields the following expressions:

$$\text{UPPER}(T) = U(T) + U'(T) \cdot (-dT) + D(T) + D'(T) \cdot (+dt) \quad (8)$$

$$\text{LOWER}(T) = U(T) + U'(T) \cdot (+dT) + D(T) + D'(T) \cdot (-dt) \quad (9)$$

Next, it is possible to express two traces which represent the sum and the difference of the signals received at upper detector 22 and lower detector 24 by adding together or subtracting Equations 8 and 9. This result in Equations 10 and 11:

$$SUM(T) = 2 \cdot U(T) + 2 \cdot D(T) \quad (10)$$

$$DIF(T) = U'(T) \cdot (-2dt) + D'(T) \cdot (+2dt) \quad (11)$$

Thereafter, it is possible to integrate the difference trace to obtain the result listed below as Equation 12:

$$INTDIF(T) = -2dt \cdot U(T) + 2dt \cdot D(T) \quad (12)$$

Those skilled in the mathematical arts will then appreciate that by scaling the integrated difference signal obtained in Equation 12 by an appropriate factor and combining that scale corrected signal with the sum trace, as expressed in Equation 10, by addition or subtraction, it will be possible to obtain either D(T) or U(T), as expressed in Equations 13 and 14 below:

$$D(T) = (\tfrac{1}{4}) \cdot (SUM(T) + (1/dt) \cdot INTDIF(T) \quad (13)$$

$$U(T) = (\tfrac{1}{4}) \cdot (SUM(T) - (1/dt) \cdot INTDIF(T) \quad (14)$$

While the mathematics described above are relatively straight forward, the Applicants have determined that in actual practice it is necessary to take several other steps in order to generate an accurate seismic trace which truly attenuates or increases either the upwardly traveling reflections or downwardly traveling reflections. These additional steps are set forth herein.

Figure 2:
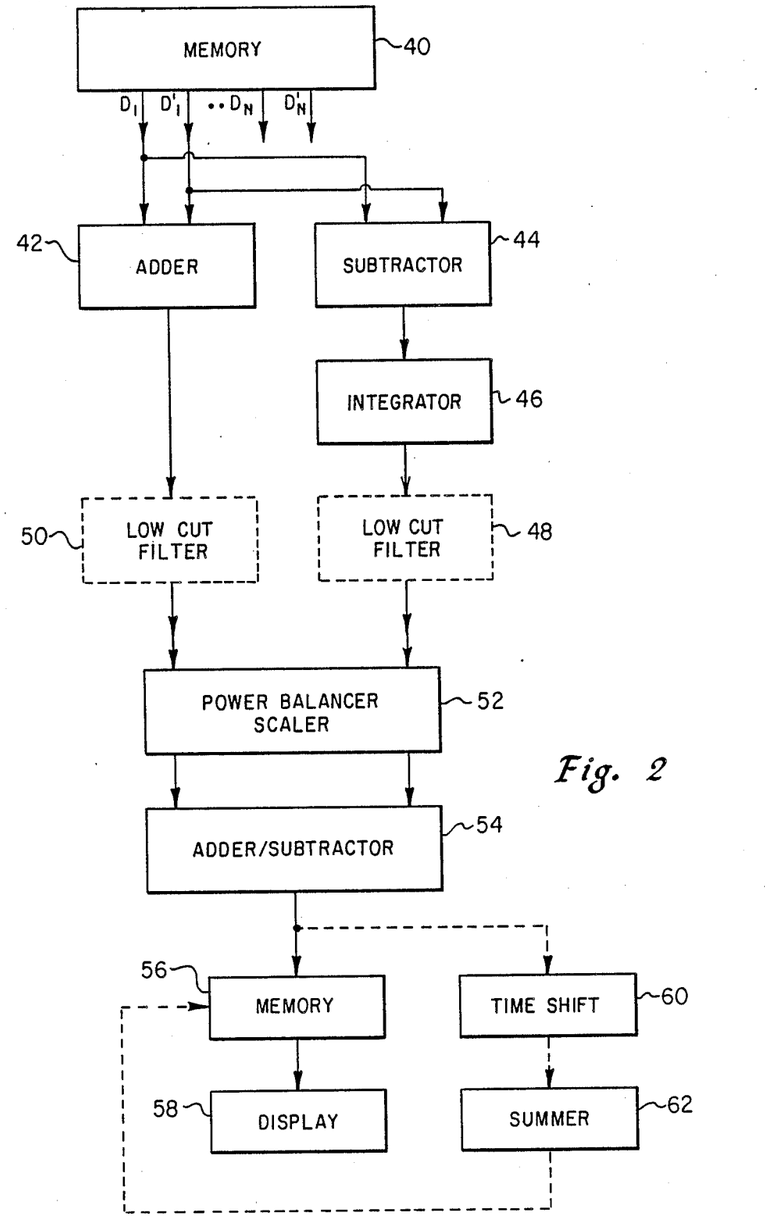
FIG. 2 is a block diagram illustrating a system for filtering seismic detector signals in accordance with the method of the present invention.

Referring now to FIG. 2, there is depicted a block diagram which illustrates a system for filtering seismic detector signals in accordance with the method of the present invention. As may be seen, the electrical signals generated from each pair of vertically spaced detectors within upper streamer 18 and lower streamer 20 (see FIG. 1) are preferably recorded and stored in a memory 40. Memory 40 is preferably controlled so as to furnish for processing a pair of detector signals $D_1$ and $D_1'$ which correspond to the seismic signals obtained from two seismic detectors which are vertically spaced within upper streamer 18 and lower streamer 20, such as upper detector 22 and lower detector 24. This pair of signals are thereafter delivered to adder 42 and subtracter 44 which are utilized, in accordance with the broad description of the method of the present invention which is described with respect to the aforementioned mathematical process, to create a sum signal and a difference signal.

The difference signal is thereafter applied to integrater 46 to create an integrated difference signal; however, the Applicants have determined that in order to provide the degree of accuracy necessary to practice this method it is necessary to address the sensitivity of the integration process to the presence of small DC bias signals on the seismic traces, or the presence of low frequency components in general. One method whereby it has been discovered that this sensitivity may be minimized is by performing a band limited integration within integrater 46. By this what is meant is an integration process which takes place only over those frequencies which are higher than a frequency which has been selected in order to decrease the sensitivity of the integration process to low frequency components. Alternately, the output of integrater 46 and the output of adder 42 may be applied to a low-cut filter which is then utilized to remove small DC bias signals or low frequency components. In practice the Applicants have discovered that it is preferable to filter out all components below 3 hertz when practicing the method of the present invention.

Thereafter, it is necessary to scale the integrated difference signal by a scaling function which is a function of the separation between the two detectors. While this technique may be utilized easily during vertical seismic profiling, due to the fact that the detectors remain a fixed and known distance apart, the motion of a marine streamer through a body of water makes determination of the actual separation of the streamers a nontrivial exercise. This problem has been solved in a preferred embodiment of the method of the present invention by applying the output of adder 42 and integrater 46 to a power balancer/scaler 52. By balancing the power between the sum trace scaling and the integrated difference trace may be easily achieved without the necessity of knowing with certainty the separation between receivers. This is particularly important in that this technique accommodates variations in separation which may occur in marine seismic surveying and may be implemented simply with known circuitry. Thereafter, the power balanced sum trace and integrated difference trace may be combined by adding or subtraction to emphasize of attenuate either the upwardly traveling reflections or the downwardly traveling reflections, as described depicted in block 54.

Next, in one optional aspect of the processing method of the present invention, the upgoing and downgoing signals generated by adding and subtracting the sum signal and the integrated difference signal, as illustrated in block 54, may be utilized to enhance the signal estimate in the following manner. As discussed above, the upgoing and downgoing signals both contain identical reflection information; however, the reflection information contained within the downgoing signal is delayed by a time equal to twice the time distance from the effective receiver position to the water surface. Block 60 illustrates the time shifting of one signal by crosscorrelation, time warping or any other technique, thereby removing the aforementioned time delay. Next, block 62 illustrates the summation of one signal with the time shifted other signal to create a resultant signal which is greatly enhanced in terms of signal-to-noise ratio.

Of course, those skilled in the art will appreciate that the corrected seismic trace generated by either of the above described methods may thereafter be stored in a memory device 56 which may comprise a magnetic tape or solid-state memory device and may be displayed for visual confirmation via display unit 58.

Those skilled in the art will appreciate upon reference to the foregoing specification that the Applicants have provided a novel method whereby the problem of downwardly traveling reflections from the water/air interface during marine seismic processing may be simply and easily eliminated by the processing of two vertically spaced seismic detector signals without the necessity of knowing the exact spacing between the two detectors. Further, it should be apparent that after isolating the upwardly traveling reflections from the downwardly traveling reflections it will be possible to shift one trace and thereafter add that trace to the remaining trace in order to enhance the signal to noise ratio.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A method of marine seismic geophysical surveying wherein a seismic energy source positioned at or near the surface of a body of water is adapted to generate seismic wave energy which is detectable by a plurality of seismic detectors linked in two vertically spaced marine streamers and towed behind a marine craft, said method comprising the steps of:
   generating seismic waves utilizing said seismic energy source;
   detecting the resultant seismic waves at said plurality of seismic detectors which are linked in two vertically spaced marine streamers and generating an electrical signal at each seismic detector representative of said detected seismic wave;
   combining said electrical signal from a first seismic detector within the lower of said two vertically spaced marine streamers with said electrical signal from a corresponding second seismic detector within the higher of said two vertically spaced marine streamers to form a sum signal;
   subtracting said electrical signal from said first seismic detector from said electrical signal from said second seismic detector to form a difference signal;
   integrating said difference signal to form an integral signal;
   removing DC bias and low frequency components from said integral signal;
   scale correcting said integral signal to form a resulting signal which is an approximation of an electrical signal from a seismic detector disposed midway between said first seismic detector and said second seismic detector; and
   combining said scale corrected resulting signal with said sum signal to obtain a modified signal wherein the amplitudes of said seismic waves which are traveling upward as they arrive at said seismic detectors are increased and the amplitudes of said seismic waves which are traveling downward as they arrive at said seismic detectors are attenuated.

2. The method of marine seismic geophysical surveying according to claim 1 further including the step of recording said electrical signals generated at each of said plurality of seismic detectors prior to combining said electrical signals.

3. The method of marine seismic geophysical surveying according to claim 1 wherein said step of removing DC bias and low frequency components from said integral signal is accomplished by low cut filtering said integral signal.

4. The method of marine seismic geophysical surveying according to claim 1 wherein said step of removing DC bias and low frequency components from said integral signal is accomplished by performing band limited integration during said integrating step.

5. A method of marine seismic geophysical surveying wherein a seismic energy source positioned at or near the surface of a body of water is adapted to generate seismic wave energy which is detectable by a plurality of seismic detectors linked in two vertically spaced marine streamers and towed behind a marine craft, said method comprising the steps of:
   generating seismic waves utilizing said seismic energy source;
   detecting the resultant seismic waves at said plurality of seismic detectors which are linked in two vertically spaced marine streamers and generating an electrical signal at each seismic detector representative of said detected seismic wave;
   combining said electrical signal from a first seismic detector within the lower of said two vertically spaced marine streamers with said electrical signal from a corresponding second seismic detector within the higher of said two vertically spaced marine streamers to form a sum signal;
   subtracting said electrical signal from said first seismic detector from said electrical signal from said second seismic detector to form a difference signal;
   integrating said difference signal to form an integral signal;
   removing DC bias and low frequency components from said integral signal;
   balancing the power in said sum signal and said integral signal; and
   combining said integral signal with said sum signal to obtain a modified signal wherein the amplitude of said seismic waves which are traveling upward as they arrive at said seismic detectors are increased and the amplitude of said seismic waves which are traveling downward as they arrive at seismic detectors are attenuated.

6. The method of marine seismic geophysical surveying according to claim 5 further including the step of removing DC bias and low frequency components from said sum signal prior to combining said sum signal and said integral signal.

7. The method of marine seismic geophysical surveying according to claim 5 wherein said step of removing DC bias and low frequency components from said integral signal is accomplished by low cut filtering said integral signal.

8. The method of marine seismic geophysical surveying according to claim 5 wherein said step of removing DC bias and low frequency components from said integral signal is accomplished by performing band limited integration during said integrating step.

9. A method of marine seismic geophysical surveying wherein a seismic energy source positioned at or near the surface of a body of water is adapted to generate seismic wave energy which is detectable by a plurality of seismic detectors linked in two vertically spaced marine streamers and towed behind a marine craft, said method comprising the steps of:

generating seismic waves utilizing said seismic energy source;

detecting the resultant seismic waves at said plurality of seismic detectors which are linked in two vertically spaced marine streamers and generating an electrical signal at each seismic detector representative of said detected seismic wave;

combining said electrical signal from a first seismic detector within the lower of said two vertically spaced marine streamers with said electrical signal from a corresponding second seismic detector within the higher of said two vertically spaced marine streamers to form a sum signal;

subtracting said electrical signal from said first seismic detector from said electrical signal from said second seismic detector to form a difference signal;

integrating said difference signal to form an integral signal;

removing DC bias and low frequency components from said integral signal;

scale correcting said integral signal to form a resulting signal which is an approximation of an electrical signal from a seismic detector disposed midway between said first seismic detector and said second seismic detector;

combining said scale corrected resulting signal with said sum signal to obtain a first modified signal wherein the amplitudes of said seismic waves which are travelling upward as they arrive at said seismic detectors are increased and the amplitudes of said seismic waves which are travelling downward as they arrive at said seismic detectors are attenuated;

combining said scale corrected resulting signal with said sum signal to obtain a second modified signal wherein the amplitudes of said seismic waves which are traveling upward as they arrive at said seismic detectors are attenuated and the amplitudes of said seismic waves which are traveling downward as they arrive at said seismic detectors are increased;

time shifting said second modified signal to obtain maximum crosscorrelation with said first modified signal; and summing said time shifted second modified signal with said first modified signal to obtain an enhanced reflection signal.

10. The method of marine seismic geophysical surveying according to claim 9 further including the step of recording said electrical signals generated at each of said plurality of seismic detectors prior to combining said electrical signals.

11. The method of marine seismic geophysical surveying according to claim 9 wherein said step of removing DC bias and low frequency components from said integral signal is accomplished by low cut filtering said integral signal.

12. The method of marine seismic geophysical surveying according to claim 9 wherein said step of removing DC bias and low frequency components from said integral signal is accomplished by performing band limited integration during said integrating step.

13. The method of marine seismic geophysical surveying according to claim 5 further including the step of recording said electrical signals generated at each of said plurality of seismic detectors prior to combining said electrical signals.

* * * * *

UNITED STATES PATENT AND TRADEMARK OFFICE
CERTIFICATE OF CORRECTION

PATENT NO. : 4,937,793

DATED : June 26, 1990

INVENTOR(S) : E. L. Shuck et al

It is certified that error appears in the above-identified patent and that said Letters Patent is hereby corrected as shown below:

In Column 2, Line 34, after "proposed in the" insert therefore --Bell et al--.

In Column 3, Line 59, the word "carth's" should read --earth's--.

In Column 5, Line 45, equation no. 13 "D(T)=1/4).(SUM(T)+(1/dt). INTDIF(T)" should read --D(T)=(1/4).(SUM(T)+(1/dt).INTIDIF(T))--

In Column 5, Line 47, equation no. 14 "U(T)=(1/4).(SUM(T)-(1/dt.INTDIF(T)" should read --U(T)=(1/4).(SUM(T)+(1/dt).INTDIF(T))--

In Column 7, Line 6, delete [$6] and insert therefore --56--.

In Column 8, Line 50, the word "amplitude" should read --amplitudes--.

UNITED STATES PATENT AND TRADEMARK OFFICE
CERTIFICATE OF CORRECTION

PATENT NO. : 4,937,793

DATED : June 26, 1990

INVENTOR(S) : E. L. Shuck et al.

It is certified that error appears in the above-identified patent and that said Letters Patent is hereby corrected as shown below:

In Column 8, Line 53, the word "amplitude" should read --amplitudes--.

Signed and Sealed this

Ninth Day of June, 1992

Attest:

DOUGLAS B. COMER

Attesting Officer

Acting Commissioner of Patents and Trademarks